Patented June 3, 1941

2,243,860

UNITED STATES PATENT OFFICE 2,243,860

PROCESS FOR THE MANUFACTURE OF BAKED GOODS

Jacob Freilich, New York, and Charles N. Frey, Scarsdale, N. Y., assignors to Standard Brands Incorporated, New York, N. Y., a corporation of Delaware No Drawing. Application November 3, 1936, Serial No. 108,964

11 Claims. (Cl. 99—90)

The invention relates to a process for the manufacture of baked goods and to a product adapted for use therein. More particularly it relates to the manufacture of yeast leavened bread, and includes correlated improvements and discoveries whereby the qualities of such bread are enhanced.

An object of the invention is to provide a process for the manufacture of baked goods having increased volume and improved texture, color and crust color.

A further object of the invention is the provision of a process in which there is incorporated in a dough batch an egg yolk-ether extractive material, either per se or in conjunction with a shortening compound or other baking accessories.

An additional object of the invention is to provide a process in accordance with which bread of improved qualities may be produced readily, economically and efficiently both by large and small bakeries.

Still another object of the invention is the provision of a product for improving the quality of baked goods which is obtained through an ether extraction of a suspension of egg yolk, and which improves the quality of low grade flours, as the soft flours and the clear flours.

A particular object of the invention is to provide a method for extracting egg yolk whereby extractives possessing the property of increasing the loaf volume of baked goods are obtained.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

In the practice of the invention baked goods of improved qualities may be produced by incorporating into a dough batch an ether extractive of egg yolk. The dough batch, e. g., for the manufacture of yeast leavened bread, may contain the usual ingredients as flour, water, salt, yeast, and if desired auxiliaries such as improver compositions, milk, a malt product and the like, and the extractive may be admixed with one or more of the dough ingredients and thus introduced into the batch, or it may be added at any time during preparation of the dough. Extraction of the egg yolk may be effected by suspending the yolk in water and extracting the suspension which is produced by an ether, for example, ethyl ether. The mass upon standing forms three layers which may be separated by any suitable means whereby the one layer may be withdrawn from the others without particular disturbance thereof.

Furthermore, the fractions obtained by the extraction and which are referred to herein as the extractives may be used alone, or as various admixtures of these fractions, or in conjunction with other materials as a shortening composition, a phosphatide and the like, as well as admixtures thereof. When preparing the extract from egg yolk an effective procedure is to suspend one part of egg yolk in from 1 to 4 parts of water. It is advisable to hold the water requirements to as low a percentage as possible, but when a highly purified product is in preparation a larger amount of water should be employed. To the suspension of yolk in water there is then added a quantity of ether which should be as large as good practice indicates. The larger the quantity of ether the greater will be the amount of ether soluble matter removed, and thereby the number of repeated or subsequent ether extractions required completely to remove the ether soluble material will be lessened.

The extractive obtained by the extraction of the water suspension with ether is permitted to stand with a resulting layering. There results three distinct layers, an upper layer which is the ether containing soluble substance, a lower layer which is composed largely of water with a small amount of soluble matter, and an intermediate water and ether insoluble layer which contains a considerable amount of a white protein material. The upper or ether layer may be further segregated into two extractive portions, one of which is primarily a liquid oil and the other a mixture of oil and solid material considered to be a protein substance. The amount of ether giving satisfactory results is a volume which is equal to the combined volumes of the yolk and the water used.

As an illustrative embodiment of a manner in which the extractives may be produced, the following description is given. The parts are by volume. 1 part of egg yolk is admixed with 1 part of water and with 2 parts of ethyl ether. The admixture is shaken or stirred vigorously and then permitted to stand until the mass in the container forms into three distinct layers. Thereupon, the upper, ether and lower, water layers are withdrawn either by siphoning or by utilization of a valve positioned near the bottom of the container, for example, a container of the separatory funnel type, and the water and ether insoluble residue or intermediate layer is further extracted with fresh portions of ether, or with ether distilled from the upper layer, until substantially all of the ether soluble matter has been removed. Complete removal of the ether extractible material is indicated by absence of color in the ether extract. The middle layer or insoluble layer in suspension may be freed from the traces of ether remaining therein by distillation under vacuum and at a low temperature. There results therefrom a suspension of the insoluble white protein fraction of egg yolk which is of marked effect when used in the production of baked products. The ether soluble extract, or the upper layer, is freed from the ether by distillation, and the ether thus recovered may be used again in making further extractions. The residue obtained contains a yellow-orange colored oil and some solid matter. It may be utilized for various purposes for which other oils or fats of like nature are generally used, and also in the production of baked products to which it is desired to impart the egg yolk color.

The extractives may be incorporated with the usual ingredients entering into the production of bread according to either the sponge or straight dough formulas and methods. The amount of the extractive, particularly the white insoluble protein fraction introduced, depends upon the loaf volume desired inasmuch as increasing amounts cause an increase in volume. A distinctive use of the extractives and advantage accruing therefrom is in connection with the weaker flours, whereby the baker is able to produce an improved bread made from flours having a lower than normal amount of protein. Typical commercial sponge and straight dough formulas for the manufacture of white bread into which the yolk extractive, especially the protein fraction, may be introduced are as follows:

SPONGE

| Sponge | Per cent | Dough | Per cent |
|---|---|---|---|
| Flour | 60 | Flour | 40 |
| Water, according to absorption | | Water, according to absorption | |
| Yeast | 2 | Sugar | 5 |
| Diamalt | ½ | Salt | 2 |
| Bread improver | ½ | Shortening | 3 |
| Protein fraction of yolk equivalent of ½ to 1 yolk per loaf, or more, in either sponge or dough stage | | Diamalt | ½ |
| | | Milk powder | 6 |

STRAIGHT DOUGH

| | Per cent |
|---|---|
| Flour | 100 |
| Water, according to absorption | |
| Yeast | 2 |
| Sugar | 5 |
| Salt | 2 |
| Shortening | 3 |
| Diamalt | 1 |
| Milk powder | 6 |
| Bread improver | ⅓ |
| Protein fraction of yolk as in sponges | |

The extractive material may be added to the dough batch as a water suspension, or it may be mixed with the flour when dry in the form of a dry powder. The dough is prepared in the ordinary manner, and thereafter is handled and baked as is usual. Results of baking tests show that the ether soluble and the insoluble protein fractions have the most pronounced effect, and that this effect depends upon the quantity introduced. Moreover, when the fractions are combined there is produced a loaf volume which is equal to that which may be produced by the original yolk. This evidences that the ether extraction of the water suspension of egg yolk does not destroy the factor or factors to which increase in loaf volume is due. Further, the volumes increased with increasing amounts of the extractive. A maximum volume was not shown, and hence the volume would appear to be a lineal function of the amount of extractive agent in the dough.

The extractives or fractions vary in their activity and the insoluble protein fraction possesses the greatest effectiveness for increasing loaf volume. This increase in loaf volume with increase in amount of extractive differs from the effects produced through the utilization of a fat or a phosphatide inasmuch as these produce only a limited increase in volume when small amounts are used and in larger amounts there is not any increase in volume. In addition the protein fraction is a white product, and hence it can be used in any desired amount in any type of bread, and also may be used with other ingredients, as the fats, without changing the color. As above indicated, the extractive may be prepared in a dry or powdered from.

A further segregation of the extractives leads to four products—(a) a liquid oil obtained from ether extract; (b) a mixture of oil and solid matter also from the ether extract; (c) insoluble white residue or protein substances; and (d) the water extract. When these fractions were combined and introduced into a dough batch in an amount equivalent to 5 grams of egg, the loaf volume was 2020 cc.; with 15 grams it was 2200 cc., and with 50 grams 2350 cc. The original egg in an amount of 5 grams gave 2010 cc. and 50 grams gave 2370 cc. A maximum value was not obtained. The insoluble residue alone in an amount of 5 grams gave 2000 cc.; 50 grams 2300 cc. and 100 grams 2380 cc. as loaf volumes. Loaves produced from batches containing the egg yolk-ether extractives have crust colors which are markedly better than the check or control loaf, and the crumb color may vary from a decided yellow to that which is substantially white, and for a given color a larger quantity of the extractive may be used than would be the case if egg yolk were utilized.

The relative potencies of the various fractions have been shown to be as follows. The a fraction used alone does not effect any considerable increase in loaf volume; b fraction occasions an increase in loaf volume and this is dependent upon the amount of the fraction used; the c fraction is the most effective and leads to decided increases in loaf volume with the increase being in proportion to the amount of the fraction present in the dough batch; and the d fraction possesses little effect upon the volume of the loaf. A combination of the a and c fractions gave loaf volumes which indicate that the fat of fraction a and the protein of fraction c are more effective in combination than when used alone. The protein fraction may also be employed in conjunction with a shortening composition, as hydrogneated oils, and thereby a loaf volume may be obtained which is substantially equal to that obtained with the combination of pure egg fat and the protein fraction. Also, a portion of the shortening may be replaced by a phosphatide, as lecithin, and if desired the protein fraction or other of the yolk extractives may be used in conjunction with lecithin. In all instances the volumes of the loaves produced are increased. The loaves obtained with a shortening composition and the protein fraction have a much whiter interior color than loaves which contain the yolk fat and this would be of distinct advantage if a white bread is especially desired. There is substantially no decrease in the activity of the protein fraction whether it is dried at a low temperature and under vacuum, or whether it is employed in the suspended condition or in colloidal form. An improvement in the volume and bread quality when the yolk extractives are used in conjunction with low grade flours was shown by tests in which a strong Northwestern flour and a clear flour were employed. In every instance the quality of the bread using the lower grade or clear flour was improved.

The invention is characterized in part by the following features: utilization of egg yolk-ether extractive fractions effects an increase in loaf volume in sponge and straight doughs and improves the products manufactured from low grade flour, such as the soft flours and the clear flours, whereby they are more nearly equal to those obtained from the strong flours; the extractives, especially the protein fraction, may be combined with other materials as various shortening compositions, e. g., lard and hydrogenated oils, lecithin and mixtures thereof; the protein residue contains approximately 80% protein and is considered to be fairly pure lecitho-vitellin compound and is especially effective as a means to increase loaf volume; the ether, oil and protein extractive or fraction effects an increase in loaf volume, but is considerably less effective than the protein fraction; the protein fraction is substantially unaltered when it is dried; a combination of the various fractions yields results substantially equal to the original egg yolk; the liquid oil and water layer extractives are decidedly less effective than the other extractives, and the liquid oil and protein fractions, when combined, have a definite effect in increasing loaf volume, which effect may also be obtained when the liquid oil is substituted by a shortening composition and/or by lecithin.

The increase in volume due to the effective protein fraction and with respect to which increasing amounts give increasing low volumes is considered to be due to the protein substance contained in this extractive rather than to any fat or phosphatide, as lecithin, which may be present. This is substantiated by the fact that the extractive with a shortening composition yields an increase in loaf volume, whereas when lecithin and the shortening alone is utilized there is little increase and markedly less than when the protein extractive fraction is employed. The procedure herein described leads to the production of loaves that are whiter in color, larger in volume, and of improved texture and crust color. Moreover when the protein fraction is utilized in admixture with cheaper ingredients, as shortening or lecithin, much smaller amounts may be employed to produce loaf volumes which are the equal of those produced by egg yolk, and a dry product which is as satisfactory as the egg yolk itself may be introduced with an improvement of low grade flours when they constitute an ingredient of the dough batch. While an extractive of egg yolk is especially referred to throughout the specification and in the claims, it will be realized that other materials containing the active substance, i. e., the protein compounds, may serve as the source.

Since certain changes in carrying out the above process, and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process for the manufacture of baked goods which comprises incorporating an ether extractive of egg yolk containing a substantial amount of egg yolk-lecitho-vitellin compound in relatively pure condition with dough ingredients, said extractive being prepared by admixing egg yolk with water, adding an ether, agitating, allowing the thus obtained mass to layer, separating layers, and removing ether therefrom.

2. A process for the manufacture of baked goods, which comprises incorporating an ether extractive of egg yolk containing a substantial amount of egg yolk-lecitho-vitellin compound in relatively pure condition into a dough batch, said extractive being prepared by admixing egg yolk with water, adding an ether, agitating, allowing the thus obtained mass to layer, separating layers, and removing ether therefrom.

3. A process for the manufacture of baked goods, which comprises incorporating an ether extractive of egg yolk consisting preponderatingly of a lecitho-vitellin compound in relatively pure condition into a dough batch, said extractive being prepared by admixing egg yolk with water, adding an ether, agitating, allowing the thus obtained mass to layer, separating layers, and removing ether therefrom.

4. A process for the manufacture of baked goods, which comprises incorporating an ether extractive of egg yolk containing a substantial amount of egg yolk-lecitho-vitellin compound in relatively pure condition together with a shortening composition into a dough batch, said extractive being prepared by admixing egg yolk with water, adding an ether, agitating, allowing the thus obtained mass to layer, separating layers, and removing ether therefrom.

5. A process for the manufacture of baked goods, which comprises incorporating an ether extractive of egg yolk containing a substantial amount of egg yolk-lecitho-vitellin compound in relatively pure condition together with lecithin into a dough batch, said extractive being prepared by admixing egg yolk with water, adding an ether, agitating, allowing the thus obtained mass to layer, separating layers, and removing ether therefrom.

6. A process for the manufacture of baked goods, which comprises incorporating an ether extractive of egg yolk consisting preponderatingly of a lecitho-vitellin compound in relatively pure condition and a shortening composition into a dough batch, said extractive being prepared by admixing egg yolk with water, adding an ether, agitating, allowing the thus obtained mass to layer, separating layers, and removing ether therefrom.

7. A process for the manufacture of baked goods, which comprises incorporating with yeast, flour, water and other dough ingredients an ether extractive of egg yolk containing a substantial amount of egg yolk-lecitho-vitellin compound in relatively pure condition, forming the mass into a dough, allowing fermentation to take place, forming, and baking, said extractive being prepared by admixing egg yolk with water, adding an ether, agitating, allowing the thus obtained mass to layer, separating layers, and removing ether therefrom.

8. A process for the manufacture of baked goods, which comprises incorporating with yeast, flour, water and other dough ingredients an ether extractive of egg yolk consisting preponderatingly of a lecitho-vitellin compound in relatively pure condition, forming the mass into a dough, allowing fermentation to take place, forming, and baking, said extractive being prepared by admixing egg yolk with water, adding an ether, agitating, allowing the thus obtained mass to layer, separating layers, and removing ether therefrom.

9. A process for the manufacture of baked goods, which comprises incorporating with yeast, flour, water and other dough ingredients an ether extractive of egg yolk consisting preponderatingly of a lecitho-vitellin compound in relatively pure condition together with a shortening composition, forming the mass into a dough, allowing fermentation to take place, forming, and baking, said extractive being prepared by admixing egg yolk with water, adding an ether, agitating, allowing the thus obtained mass to layer, separating layers, and removing ether therefrom.

10. A process for the manufacture of baked goods, which comprises incorporating with yeast, flour, water and other dough ingredients an ether extractive of egg yolk consisting preponderatingly of a lecitho-vitelling compound in relatively pure condition together with lecithin, forming the mass into a dough, allowing fermentation to take place, forming and baking, said extractive being prepared by admixing egg yolk with water, adding an ether, agitating, allowing the thus obtained mass to layer, separating layers, and removing ether therefrom.

11. A process for the manufacture of baked goods, which comprises incorporating with yeast, flour, water and other dough ingredients an ether extractive of egg yolk containing egg fat and yolk lecitho-vitellin compound in relatively pure condition, forming the mass into a dough, allowing fermentation to take place, and subsequently baking.

JACOB FREILICH.
CHARLES N. FREY.